United States Patent

[11] 3,564,246

[72] Inventor Roderick Gordon Morrison
 Los Alamos, N. Mex.
[21] Appl. No. 477,627
[22] Filed Aug. 5, 1965
[45] Patented Feb. 16, 1971
[73] Assignee the United States of America as represented by the United States Atomic Energy Commission

[54] GAMMA COMPENSATED FISSION THERMOCOUPLE
 3 Claims, 3 Drawing Figs.
[52] U.S. Cl. ................................................ 250/83.1, 176/19
[51] Int. Cl. .................................................. G01t 3/04
[50] Field of Search ..................................... 250/83.1, NEV-D; 313/61 (orig.); 176/19

[56] References Cited
UNITED STATES PATENTS
2,437,476 3/1948 Parker ........................ 250/83.1
2,993,138 7/1961 Scott, Jr. ..................... 313/61
3,226,547 12/1965 Bloom ......................... 250/83.1
FOREIGN PATENTS
950,896 2/1964 Great Britain ............... 250/83.1

Primary Examiner—James W. Lawrence
Assistant Examiner—Morton J. Frome
Attorney—Roland A. Anderson ABSTRACT: A neutron flux measuring apparatus being the combination of a first and a second thermocouple connected in series in polarity opposition and each comprising an identical pair of dissimilar leads and a middle metallic spherical body having a diameter equal substantially to the mean free path of a thermal neutron in the uranium isotope, the neutron flux of which is being measured, one of the middle metallic bodies being of fissionable material and the other middle metallic body being of nonfissionable material but being equally gamma responsive.

PATENTED FEB 16 1971 3,564,246

INVENTOR.
Roderick G. Morrison
BY

GAMMA COMPENSATED FISSION THERMOCOUPLE

This invention relates to a neutron sensing device and more particularly to a neutron energy measuring device which functions by virtue of the thermoelectric properties of its elements.

A neutron measuring device having rapid response and physical properties which enable it to be associated with the control mechanism of a nuclear reactor has a number of advantages over prior art devices for the purpose.

A number of types of neutron flux responsive detecting devices are available in the prior art. For example, in the book, Principles of Nuclear Reactor Engineering, 1st edition, by Samuel Glasstone, published by D. Van Nostrand, the various types of nuclear instrumentation detectors are discussed in paragraphs 5.110 to 5.127.

For reactor control purposes, the neutron flux detector must respond very rapidly so as to provide a virtually immediate indication of local power variation. No prior art detector was capable of satisfactory measurement of neutron flux over the whole range from startup to full power. Consequently, control instrumentation available in the prior art required dividing the power range into a plurality of regions as described in the Glasstone reference paragraph 5.112.

Another problem encountered in nuclear reactor control instrumentation involves the necessity of detecting the neutrons in the presence of strong gamma radiation and as pointed out by Glasstone in paragraph 5.113, this necessity conflicts with the necessity of accurate and rapid response to changes in neutron flux in the presence of strong gamma fields. The reason for the conflict is that under conditions of small neutron flux and high gamma radiation, as upon restart of a reactor, a detector of the ionization chamber or proportional counter types must have a long integrating time in order to be accurate, and if such instruments are designed to respond rapidly, the readings will be inaccurate. A useful instrument of the prior art which resolved the aforementioned conflict to some extent is the parallel-plate ionization chamber. This instrument responds somewhat to gamma radiation but this effect can be compensated for in the adjustment of the instrument. A more serious hindrance to the use of this instrument is its bulk which inhibits its application in the numbers necessary for insertion in a reactor to obtain a satisfactory indication of the neutron flux averaged over the reactor volume.

The problem associated with ionization chamber size is avoided in the prior art by the use of the boron-coated neutron thermopile.

This instrument is normally made up of approximately 40 thermocouples with alternate junctions coated with boron and the whole assembly inclosed in an envelope about the size of a fountain pen. This device generates a voltage in response to the heating of the boron by neutron interaction. However, although the boron thermopile has certain advantages, its response is slow and therefore its applications are limited to situations where rapid response is not a necessity.

It is, therefore, an object of the present invention to provide a compact rugged neutron detector having an exceedingly rapid response.

It is another objective of this invention to combine dissimilar thermocouples in such a manner as to eliminate the effects of gamma radiation when only neutron flux is of interest.

It is still another object of the present invention to provide a combination of dissimilar thermocouples so as to provide a detector responsive to a selected neutron energy group.

The manner of achievement of the foregoing objects as well as that of other objects and advantages will become apparent from the following description taken with the drawings made a part thereof. In the drawing.

Basic principles applicable to the thermocouple of the present invention are that the temperature of the hot junction is generated internally in the thermocouple by the interaction with colliding neutrons and that the physical size be such that uniform heating of the sensor is assured. An intermediate body is interposed in the thermocouple junction, which body is actual nuclear fuel material and of proper size so that its temperature is uniformly directly generated throughout its volume by the interaction with the incident neutron flux i.e., the temperature throughout its volume is not perturbed by self neutron shielding.

Figure 1:
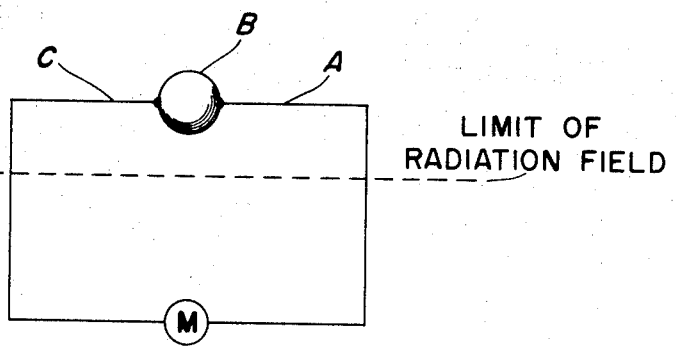
FIG. 1 is a schematic diagram of the neutron sensing thermocouple of the present invention.

One example of a thermocouple made in accordance with this invention is shown in FIG. 1.

Two thermocouple leads A and C are in electrical contact with a fissile metal body B which will be heated by incident neutron and gamma flux. Body B is small enough to prevent neutron self shielding and, therefore, is heated uniformly throughout its volume so that the temperature is the same at both points of contact with the thermocouple leads. Leads A and C are dissimilar thermocouple metals which are insensitive to neutron impingement. Therefore, only body B will heat due to neutron and gamma effects but both leads A and C will heat due to gamma deposition. In one practical embodiment the intermediate metal B is a uranium-235 bead having a diameter of 0.016 inch in diameter. The dimension of 0.016 inch is chosen because it represents approximately a mean-free path for a thermal neutron.

The thermocouple of FIG. 1 therefore delivers an output potential which is the resultant of neutron and gamma heating of body B and gamma heating of leads A and C. The thermocouple materials may conveniently be chosen to be Chromel for A and Alumel for C.

As stated supra, if the detector is to be responsive only to neutron flux, the e.m.f. derived from gamma heating of body B as well as from dissimilar gamma heating of leads A and C must be eliminated.

Figure 2:
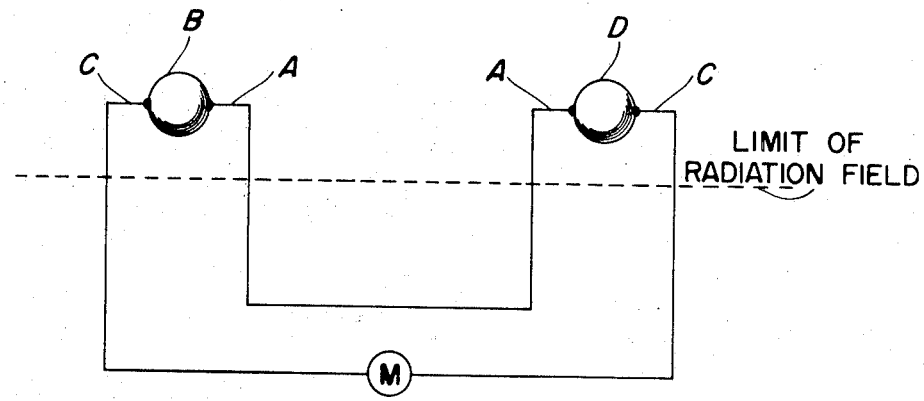
FIG. 2 is a schematic diagram of two dissimilar thermocouples in series in accordance with the present invention.

The combination of two dissimilar thermocouples in series opposition as shown in FIG. 2 eliminates the gamma energy effects. The middle metal D of the second thermocouple is chosen to be insensitive to fission cross section and to have a similar density to metal body B so that it is equally sensitive to gamma heating.

The two thermocouples A, B, C and A, D, C are connected in polarity opposition. Therefore, contact potentials due to dissimilar heating by gamma energy of metals A and C are canceled out. The e.m.f. due to the rise in temperature of bodies B and D due to gamma heating is also canceled out. This arrangement therefore provides an e.m.f. reading at M resulting only from the heating of body B by neutron energy deposition.

The combination of two thermocouples in series, one only of which responds to neutron bombardment has other desirable features of versatility than elimination of gamma response. Referring again to FIG. 2, one can utilize metals in D which have a selective neutron response. For example, if metal D is chosen to be uranium-238, it will heat due to neutrons having energies above about 1.5 m.e.v. Metal B heats up due to all impinging neutrons having energies above the thermal threshold. The output reading from the e.m.f. indication M is now proportional to the neutron energies below approximately 1.5 m.e.v.

If cadmium is chosen as metal D, it will heat up in response to impinging neutrons having energies below one k.e.v., i.e., thermal energies, and thus one obtains an electrical reading corresponding to the quantity of neutrons having energies above the thermal level.

It is within the spirit of this invention to select the middle metal body of the second thermocouple to have a cross section due to neutron absorption such as to enable the measurement of neutron flux within any desirable energy group.

A composite thermocouple connected as shown in FIG. 2 with the middle metal beads having a diameter of the order of 0.0160 inch (desirably the length of the mean-free path of thermal neutrons in the material selected) and with thermocouple leads having a diameter of 0.0005 inch, has a resolution time of about 10 microseconds.

Figure 3:
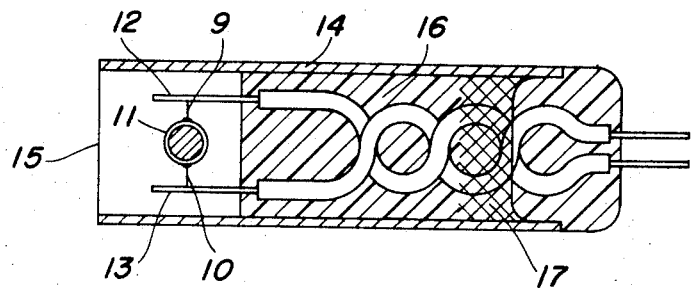
FIG. 3 is a drawing of a practical embodiment of the thermocouple of the present invention enlarged many times for clarity.

An actual practical embodiment of the thermocouple of the present invention is shown in FIG. 3 in a vertical cross section slightly offcenter enlarged many times for clarity. The thermocouple wires 9 and 10 having a diameter of 0.001 inch are welded at one end to a 0.016 inch diameter U-235 sphere 11. The free ends of the thermocouple wires 9 and 10 are welded to No. 30 leads 12 and 13 of similar material. The thermocouple is easily insulatingly supported in an aluminum tube 14 of less than a centimeter in diameter utilizing techniques old in the art. The insulated thermocouple wires 12 and 13 are insulatingly supported in the tube by a high temperature potting compound 16. A wire mesh gamma radiation shield 17 is supported in the housing 14 and closely surrounds wires 12, 13. A thin metal membrane 15 closes the end of tube 14 to protect the thermocouple.

The neutron detector of the present invention utilizes the thermocouple principle in a manner fundamentally different from normal thermocouple application in that the thermocouple junction is not externally heated. It follows that an additional advantage lies in the fact that the necessity for heat coupling with the reactor fuel is avoided.

It is apparent that many variations in the application of the teachings of this invention are possible. It is to be understood therefore that the forms of application of the invention herein shown and described are to be regarded as illustrative of the invention only and not as restricting the appended claims.

I claim:

1. A neutron flux detector which is nonresponsive to gamma radiation comprising a first thermocouple comprising two dissimilar thermocouple leads having a diameter not in excess of 0.001 inch and an intermediate electrical and heat conducting body of fissionable material and size and a second thermocouple comprising two thermocouple leads of the same material as the thermocouple leads of the first thermocouple and an intermediate electrical and heat conducting body of nonfissionable metal, said first thermocouple leads being electrically and thermally affixed to the first intermediate body to form a first composite thermocouple and the second thermocouple leads being electrically and thermally affixed to the second intermediate body to form a second composite thermocouple, said first and second composite thermocouples being serially electrically connected in circuit in polarity opposition with each other, an electrically responsive measuring device and means electrically connecting the measuring device in series with the said circuit of the composite thermocouples in which the intermediate conducting body of the first thermocouple is a sphere of fissionable material having a diameter of 0.016 inch, substantially, and the intermediate conducting body of the second thermocouple is a sphere of nonfissionable metal having a diameter of 0.016 inch, substantially.

2. The neutron flux detector of claim 1 in which the intermediate conducting body of the first thermocouple is a uranium isotope and the intermediate conducting body of the second thermocouple is a nonfissionable metal having substantially the same density and size as that of the intermediate conducting body of the first thermocouple.

3. The neutron flux detector of claim 2 in which the intermediate conducting body of the first thermocouple is uranium-235 and the intermediate conducting body of the second thermocouple is tungsten.